United States Patent [19]

Chen

[11] Patent Number: 5,536,104
[45] Date of Patent: Jul. 16, 1996

[54] TWO-STEP AND TOOTHLESS BICYCLE HEAD SHAFT BOWL SET

[76] Inventor: Chia-Ching Chen, 307, Chieh-Shou Villiage, Changhua City, Taiwan

[21] Appl. No.: 338,116

[22] Filed: Nov. 9, 1994

[51] Int. Cl.⁶ ........................................ F16B 2/14
[52] U.S. Cl. ................... 403/370; 403/374; 403/24; 74/551.1; 280/279
[58] Field of Search .................. 403/264, 24, 26, 403/365, 367, 368, 370, 371, 373, 374; 280/279; 74/551.1

[56] References Cited

U.S. PATENT DOCUMENTS

| | | | |
|---|---|---|---|
| 4,068,858 | 1/1978 | Harrison et al. | 403/370 X |
| 4,167,352 | 9/1979 | Pletscher | 403/374 X |
| 5,085,063 | 2/1992 | Van Dyke et al. | 403/374 X |
| 5,095,770 | 3/1992 | Rader, III . | |
| 5,197,349 | 3/1993 | Herman | 403/374 X |
| 5,201,242 | 4/1993 | Chi | 74/551.1 |
| 5,213,006 | 5/1993 | Liao | 403/374 X |
| 5,387,255 | 2/1995 | Chiang | 403/104 X |
| 5,400,676 | 3/1995 | Kao | 280/279 X |

Primary Examiner—Kenneth J. Dorner
Assistant Examiner—Harry C. Kim
Attorney, Agent, or Firm—Larson and Taylor

[57] ABSTRACT

A two-step and toothless bicycle head shaft bowl set has a two-step locking device making use of two semi-cylindrical members and an upper cover provided with a fastening bolt. The two semi-cylindrical members can be caused to effect the fastening by tightening the fastening bolt of the upper cover. The two-step locking device is capable of effecting an automatic alignment of centers of the component parts of the device in conjunction with arcuate lashing rings. The two-step locking device can also be used to enable the bearings to be positioned at an optimum horizontal angle so as to ensure a smooth rotation of the bearings and to eliminate the gap between two component parts.

5 Claims, 4 Drawing Sheets

5,536,104

TWO-STEP AND TOOTHLESS BICYCLE HEAD SHAFT BOWL SET

BACKGROUND OF THE INVENTION

The present invention relates generally to a bicycle, and more particularly to a two-step and toothless bicycle head shaft bowl set.

A head steel tube, a handle sleeve and a front fork steel tube of the bicycle are susceptible to swaying and making noise when an excessively large gap exists among the head steel tube, the handle sleeve and the front fork steel tube. A conventional remedy for such a situation as described above is illustrated in FIG. 1. Two spring pieces 1A are inserted into the front fork steel tube 71A and are fastened thereinto by a fastening bolt 11A. A lashing ring 50A is so pressed as to cause the handle sleeve 40A to be fastened securely with the front fork steel tube 71A. The spring piece 1A is generally suitable for use in bringing about a locking effect in the inner wall of a tube made of a soft material. As a result, the spring piece 1A is not effective in bringing about a locking effect inside the rigid front fork tube 71A made of a metal material. In addition, when the spring pieces 1A are pulled upwards, the handle sleeve 40A and the front steel tube 60A cannot be pressed securely resulting in a gap. Therefore, an improved remedy was introduced, as illustrated in FIG. 2. A front fork steel tube 71B is provided in the front end thereof with an inner threaded hole 72B to which a rod 40B, a compression ring 50B, a seat ring 61B and a front tube 60B are fastened in that order by means of an adjustment nut 2B. The adjustment nut 2B may loosen easily by the vibration of the bicycle. As a result, the rod 40B, the front tube 60B and the front fork steel tube 71B are rather vulnerable to swaying and making noise. Another method of fastening such component parts as described above is to force the bearing seat into the bottom of the front fork steel tube by an external mechanical force of a hammer before the component parts are fastened securely in place. Such a method as described above is time-consuming and inefficient.

SUMMARY OF THE INVENTION

It is therefore the primary objective of the present invention to provide a two-step fastening device capable of securing the front steel tube and the handle sleeve in the front fork steel tube. In addition, the front fork tube is provided respectively at the upper and the lower ends thereof with a lashing ring of an arcuate construction for improving the effect of the automatic alignment of the centers of various members of the bearing.

The foregoing objective, structures and functions of the present invention will be more readily understood upon a thoughtful deliberation of the following detailed description of the present invention in conjunction with the accompanying drawings.

DETAILED DESCRIPTION OF THE INVENTION

Figure 4:
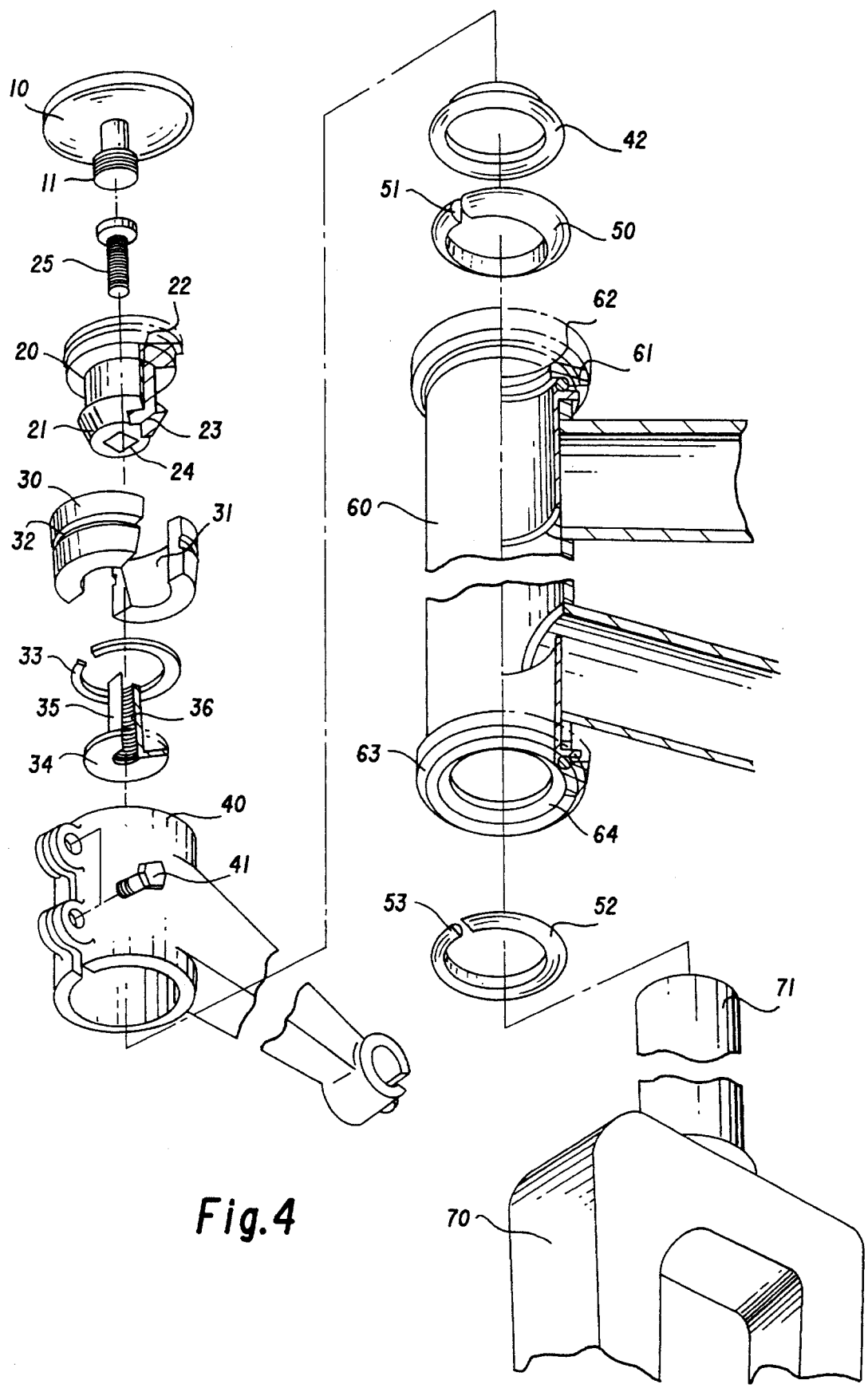
FIG. 4 shows an exploded view of the two-step and toothless bicycle head shaft bowl set of the present invention.

As shown in FIG. 4, the present invention comprises the component parts which are described explicitly hereinafter.

An upper cover 10 is provided centrally at the lower side thereof with a bolt 11.

A fastening sleeve 20 of a stepped cylindrical construction is located under the upper cover 10 and is provided at the front edge thereof with a conical portion 21. The fastening sleeve 20 is further provided with a threaded hole 22 and a through hole 23 in which a bolt 25 is received. The fastening sleeve 20 is provided at the front end thereof with a stop hole 24 of a square construction.

Two semi-cylindrical members 30 are symmetrical with each other and are provided respectively in the outer wall surface thereof with a retaining groove 32 in which a retaining ring 33 is received such that the two semi-cylindrical members 30 are held securely together by the retaining ring 33. As a result, the two semi-cylindrical members 30 form together a cylindrical body which is provided therein with a tapered bevel surface 31.

A locking body 34 is located under the retaining ring 33 and is provided thereon with a square stop column 35 and is further provided centrally with a threaded hole 36 so as to be fitted into the stop hole 24 of the fastening sleeve 20 for fastening securely the fastening sleeve 20 with the semi-cylindrical members 30 in conjunction with the bolt 25.

A washer 42 and a lashing ring 50 of an arcuate construction are disposed between a handle sleeve 40 and the upper end of a front steel tube 60. The lashing ring 50 is provided with a cut 51. The front steel tube 60 is provided at the upper end thereof and the lower end thereof with bearings 61 and 63, which are provided therein with recessed arcuate surfaces 62 and 64.

An arcuate lashing ring 52 is disposed between the lower end of the front steel tube 60 and a front fork 70 and is provided with an indentation 53. The front fork 70 is provided at the upper end thereof with a front fork steel tube 71.

Figure 1:
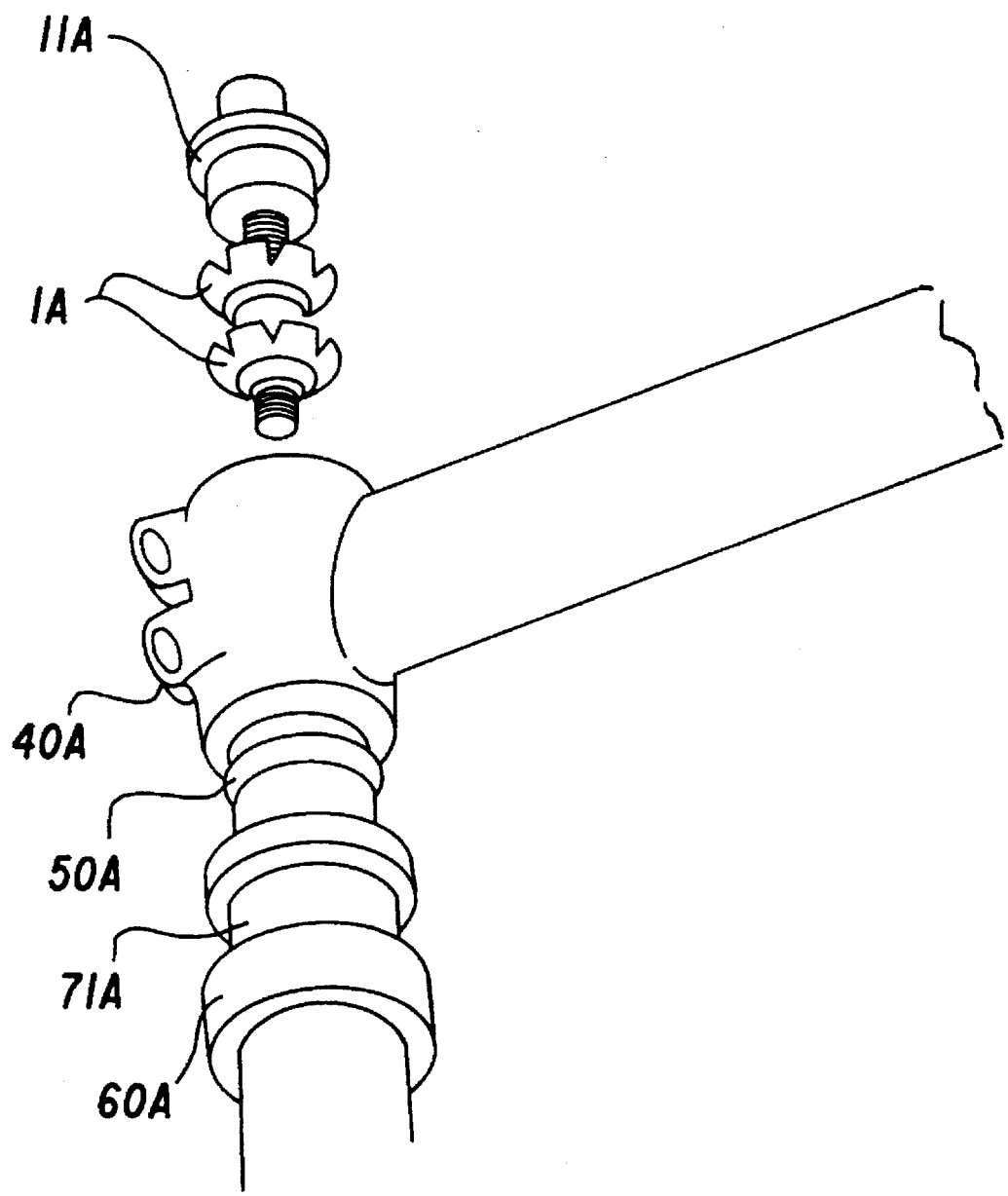
FIG. 1 shows a perspective view of a prior art bicycle head shaft bowl set.
Figure 2:
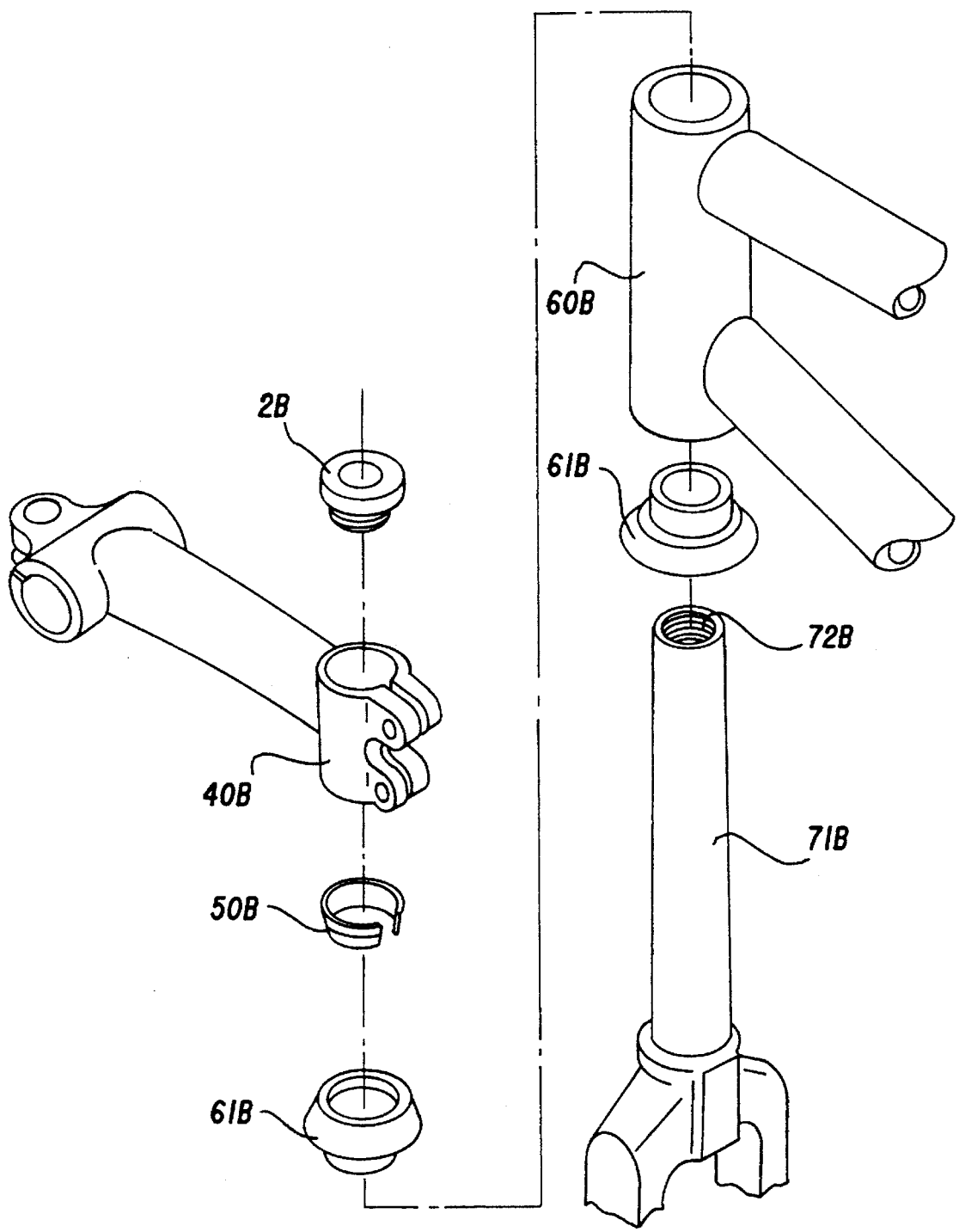
FIG. 2 shows an exploded view of another prior art bicycle head shaft bowl set.
Figure 3:
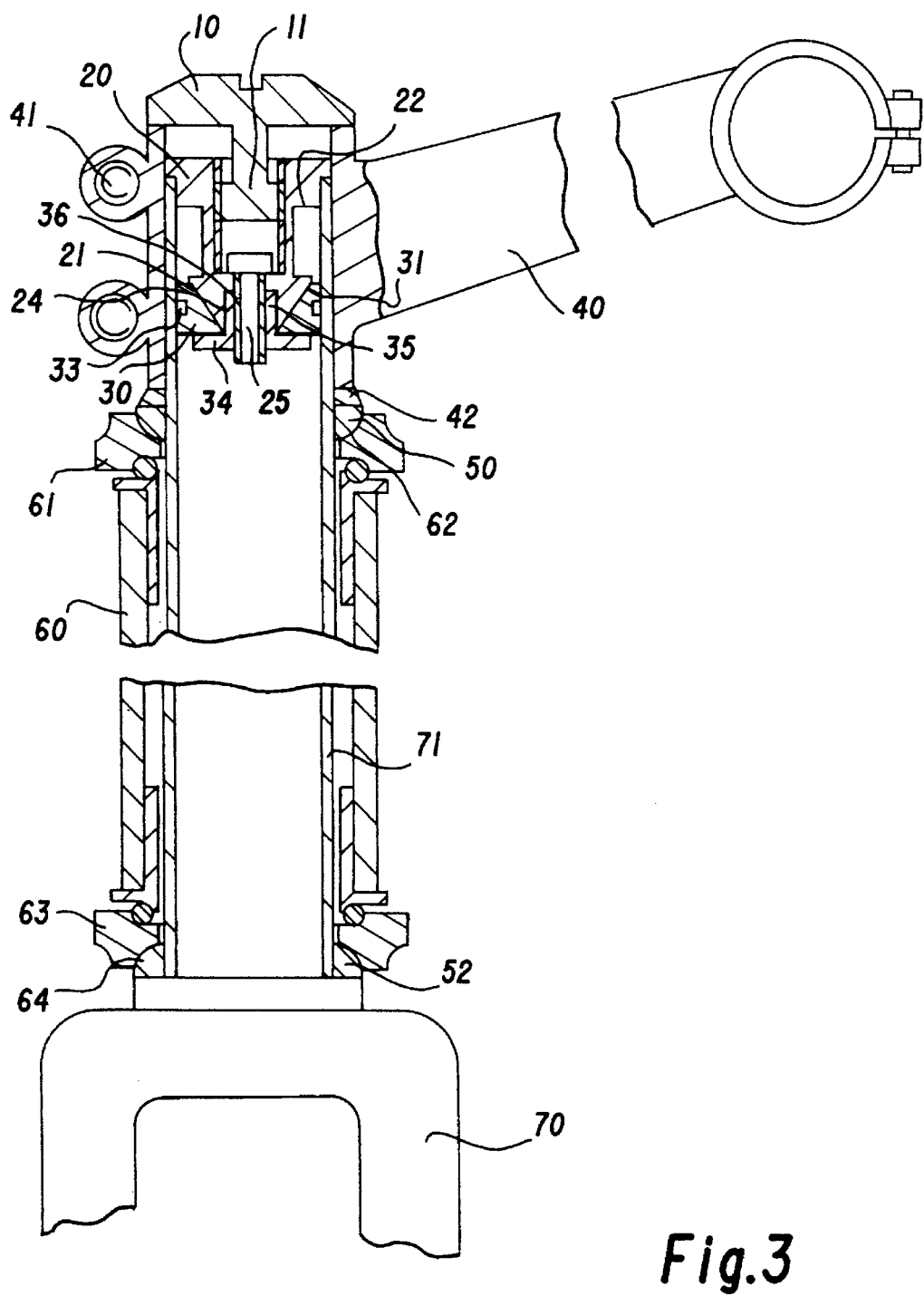
FIG. 3 shows a schematic view of the two-step and toothless bicycle head shaft bowl set of the present invention.

An shown in FIGS. 3 and 4, the cylindrical body, which is formed by the two semi-cylindrical members 30 in conjunction with the retaining ring 33, is fastened with the sleeve 20 by means of the stop column 35 of the locking body 34, which is inserted into the stop hole 24 of the fastening sleeve 20 so as to prevent the locking body 34 from turning along with the fastening bolt 25 when the fastening sleeve 20 and the semi-cylindrical member 30 are fastened by the fastening bolt 25 and the locking body 34 before the cylindrical body is inserted into the front fork steel tube 71. The conical portion 21 of the sleeve 20 can be caused to press against the tapered bevel surface 31 of the semi-cylindrical members 30 by tightening the bolt 25. As a result, the two semi-cylindrical members 30 are caused to expand so as to support the front fork steel tube 71, thereby causing the sleeve 20 to be fastened securely in the front fork steel tube 71. The lashing ring 52, the bearing 63, the front steel tube 60, the bearing 61, the lashing ring 50, the washer 42 and the handle sleeve 40 are fitted in that order over the front fork steel tube 71. It must be noted here that the lashing rings 50 and 52 are provided respectively with the cut 51 and the indentation 53, and that the bearings 61 and 63 are provided therein with the recessed arcuate surfaces 62 and 64. As a result, the center and the horizontal angle of each of the component parts of the present invention can be aligned automatically when the component parts are put together. The handle sleeve 40 is tightened on the front fork steel tube 71 by bolts 41.

The present invention has inherent advantages, which are expounded explicitly hereinafter.

The fastening sleeve 20 is secured to the inside of the front fork steel tube 71 by means of the two semi-cylindrical members 30 which can be caused to expand by tightening bolt 25. As a result, the fastening sleeve 20 can not be pulled out even if the upper cover 10 is caused to fasten downwards.

The fastening effect of the present invention is further reinforced by the lashing rings 50 and 52, which are provided respectively with the cut 51 and the indentation 53. In addition, the bearings 61 and 63 are provided with the recessed arcuate surfaces 62 and 64. As a result, the centers and the horizontal angles of the component parts of the present invention can be so aligned as to ensure the smooth rotation of the bearings 61 and 63 and to eliminate the gap that may exist between the two component parts.

The front fork can be turned easily in view of the fact that the centers and the horizontal angles of the component parts of the present invention can be aligned automatically at the time when the component parts are put together.

The front fork steel tube of the present invention is provided in the bottom thereof with the lashing rings and the bearings. As a result, when the bearing bottom seat is assembled, the bearing bottom seat can be disposed in the bottom of the front fork steel tube by fitting the lashing ring over the bottom of the front fork steel tube without the use of a mechanical force of the hammer.

The fastening sleeve and the semi-cylindrical members of the present invention can be fastened securely with precision in view of the fact that the stop column of the locking body is inserted into the stop hole of the fastening sleeve so as to prevent the locking body from turning along with the fastening bolt when the fastening bolt is tightened up.

What is claimed is:

1. A two-step and toothless bicycle head shaft bowl set comprising:

an upper cover provided centrally at a lower side thereof with a first fastening bolt;

a fastening sleeve having a stepped construction and disposed under said upper cover, said fastening sleeve including a conical portion at a front edge thereof, said fastening sleeve further including a threaded hole in which said first fastening bolt is received, a stop hole at a front end thereof and a through hole positioned between said threaded hole and said stop hole;

two semi-cylindrical members symmetrical with each other each of said semi-cylindrical members including, in an outer wall surface thereof, a retaining groove in which a retaining ring is received such that said two semi-cylindrical members are held securely together by said retaining ring to form a cylindrical body having a tapered bevel surface therein;

a locking body located under said retaining ring and including a stop column engageable with said stop hole of said fastening sleeve and a threaded hole engageable with a second fastening bolt for fastening said fastening sleeve with said semi-cylindrical members;

a washer disposed between a handle sleeve of a bicycle and an upper end of a front steel tube of said bicycle;

a first arcuate lashing ring disposed between said handle sleeve and said upper end of said front steel tube, said lashing ring having a cut therein, said front steel tube including bearings at the upper end and a lower end thereof, said bearings having recessed arcuate surfaces; and a second arcuate lashing ring disposed between said lower end of said front steel tube and a front fork of said bicycle said second arcuate lashing ring having an indentation therein, said front fork having a front fork steel tube at an upper end thereof.

2. The two-step and toothless bicycle head shaft bowl set according to claim 1 wherein said two semi-cylindrical members are expanded by tightening said second fastening bolt to fasten said fastening sleeve with said front fork steel tube.

3. The two-step and toothless bicycle head shaft bowl set according to claim 1 wherein said first and second lashing rings are positioned in said recessed arcuate surfaces of said bearings.

4. The two-step and toothless bicycle head shaft bowl set according to claim 1 wherein said bearing and said arcuate lashing ring at the lower end of said front steel tube are fitted over a bottom of said front fork steel tube without the use of an external mechanical force of a hammer.

5. The two-step and toothless bicycle head shaft bowl set according to claim 1 wherein said stop column of said locking body is inserted into said stop hole of said fastening sleeve for preventing said locking body from turning along with said second fastening bolt when said second fastening bolt is tightened, to enable said fastening sleeve and said cylindrical members to be fastened securely with precision.

\* \* \* \* \*